(12) United States Patent
Allen et al.

(10) Patent No.: US 9,579,942 B2
(45) Date of Patent: Feb. 28, 2017

(54) INTEGRAL 5-LINK INDEPENDENT SUSPENSION SYSTEMS

(71) Applicant: FORD GLOBAL TECHNOLOGIES, LLC, Dearborn, MI (US)

(72) Inventors: Steve Scott Allen, Saline, MI (US); Steven C. Hopson, Saline, MI (US); Joe L. Buchwitz, Huntington Woods, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 56 days.

(21) Appl. No.: 14/191,999

(22) Filed: Feb. 27, 2014

(65) Prior Publication Data
US 2015/0239314 A1 Aug. 27, 2015

(51) Int. Cl.
*B60G 3/20* (2006.01)
*B60G 11/16* (2006.01)

(52) U.S. Cl.
CPC .............. *B60G 3/20* (2013.01); *B60G 11/16* (2013.01); *B60G 2200/18* (2013.01); *B60G 2204/1244* (2013.01); *B60G 2206/50* (2013.01)

(58) Field of Classification Search
CPC .. B60G 3/20; B60G 11/16; B60G 2204/1244; B60G 2200/18; B60G 2206/50
See application file for complete search history.

(56) References Cited

U.S. PATENT DOCUMENTS

| 4,556,238 A | * | 12/1985 | Matschinsky | B60G 3/24 |
| | | | | 280/124.135 |
| 5,102,159 A | * | 4/1992 | Sato | B60G 3/202 |
| | | | | 280/124.143 |
| 6,123,351 A | * | 9/2000 | Bruehl | B60G 3/20 |
| | | | | 280/124.135 |
| 6,938,908 B2 | | 9/2005 | Oda et al. | |
| 7,891,684 B1 | | 2/2011 | Luttinen et al. | |
| 2005/0140110 A1 | | 6/2005 | Lee et al. | |

FOREIGN PATENT DOCUMENTS

| DE | 102 07 654 A1 | 9/2003 |
| JP | H05254319 A | 5/1993 |
| JP | H06336105 A | 6/1994 |
| WO | WO 2007/045308 A1 | 4/2007 |

OTHER PUBLICATIONS

Machine translation of JPH05254319 A, original document dated May 10, 1993.
Machine translation of JPH06336105 A, original document dated Jun. 12, 1994.
Machine translation of WO 2007/045308 A1, original document dated Apr. 26, 2007.

* cited by examiner

*Primary Examiner* — Paul N Dickson
*Assistant Examiner* — Joselynn Y Sliteris
(74) *Attorney, Agent, or Firm* — Jones Robb, PLLC; Raymond L. Coppiellie

(57) ABSTRACT

A 5-link independent suspension system for a motor vehicle may include a steering knuckle and a trailing link extending along a single axis. The trailing link may be connected to the steering knuckle and be configured to attach to a frame rail of the vehicle. The suspension system may further include an integral link connected to the steering knuckle and configured to attach to the trailing link.

21 Claims, 3 Drawing Sheets

INTEGRAL 5-LINK INDEPENDENT SUSPENSION SYSTEMS

TECHNICAL FIELD

The present disclosure relates generally to suspension systems of motor vehicles. More specifically, the present disclosure relates to 5-link independent rear suspension systems.

BACKGROUND

A vehicle's suspension system plays a vital role in both serving to isolate the occupants of the vehicle from the irregularities of the road surface, and helping to control the stability of the vehicle by managing the relative position of the wheels to the vehicle body during the vehicle's operation. Suspension systems are divided into two main categories, dependent and independent, terms which refer to the ability of the opposing wheels (i.e., the wheels on the same axle) to move independently of each other. In general, with a dependent suspension, the movement of one wheel affects the orientation of the opposing wheel. An independent suspension, on the other hand, allows one wheel to move freely and unhindered by the opposing wheel, thereby allowing the wheels to react individually to the bumps and dips in the road surface. An independent rear suspension (IRS), for example, allows for the rear wheels of the vehicle to be independently sprung.

IRS systems can also take various forms, including, for example, a double wishbone suspension, a multi-link suspension, and an integral link suspension. A double wishbone suspension, for example, has two sets of lateral "A" arms, which are generally called upper and lower control arms, and toe links. Each control arm has two attachments to the body and a single attachment to the steering knuckle (or wheel carrier). The three knuckle attachments (upper arm, lower arm, and toe link) on each side establish the plane of each wheel and control both camber angle and toe angle while reacting to wheel loads. Each side is separate from the other half which serves to independently isolate the reaction of each wheel to the road surface.

A more refined form of the double wishbone suspension is the multi-link suspension, which conceptually separates the structural performance of each "A" arm into two tension/compression links. Thus, a conventional 5-link suspension system can be thought of as separating the upper control arm into an upper trailing link and a camber link, separating the lower control arm into a lower link arm and a spring link, and retaining the toe link. The orientation and length of each link governs the suspension's geometric performance as well as the magnitude of link loading when wheel forces are reacted.

An integral link suspension connects a steering knuckle to an isolated sub-frame by means of a lower control arm, a camber link and a toe link. The steering knuckle is directly connected to the lower control arm via a pivot point and indirectly via an additional link, the integral link. The integral link may, for example, decouple caster compliance from longitudinal compliance, thereby preventing the need for a trailing link or control blade. An integral link rear suspension is, therefore, softer in wheel recession rate vs. the conventional 5-link suspension, stiffer in caster stiffness vs. the conventional 5-link suspension, and allows for a lower rear body rail package for increased interior volume (since the upper trailing link is eliminated). Accordingly, the integral link suspension may provide a substantial reduction in cruising interior noise, while also significantly improving impact harshness and aftershake, as compared with the conventional 5-link suspension, while not compromising vehicle handling.

Although an integral link suspension system has various advantages over the conventional 5-link suspension system, a conventional integral link suspension typically costs and weighs significantly more than the 5-link suspension (which utilizes a compilation of relatively light and inexpensive two-force members) often making its use not feasible for standard applications.

It may, therefore, be advantageous to provide an IRS system that functions like an integral link suspension system (which provides the advantages of the integral link system vs. the conventional 5-link system), while having a cost and weight similar to that of the conventional 5-link system.

SUMMARY

In accordance with various exemplary embodiments, the present disclosure provides a 5-link independent suspension system for a motor vehicle. In accordance with various embodiments of the present disclosure, the 5-link independent suspension system may include a steering knuckle and a trailing link extending along a single axis. The trailing link may be connected to the steering knuckle and be configured to attach to a frame rail of the vehicle. The suspension system may further include an integral link connected to the steering knuckle and configured to attach to the trailing link.

In accordance with various additional embodiments of the present disclosure, a 5-link independent suspension system for a motor vehicle may include a steering knuckle disposed within an internal space of a rear wheel of the vehicle. The suspension system may also include a trailing link connected to a lower end of the steering knuckle and extending along a single axis between the steering knuckle and a frame rail of the vehicle. The suspension system may further include an integral link connected to the steering knuckle above the trailing link and extending between the steering knuckle and the trailing link.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles of the disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

In accordance with various exemplary embodiments, the present disclosure contemplates an independent rear suspension (IRS) system for a motor vehicle that functions similar to a conventional integral link suspension system, while having a cost and weight similar to that of a conventional 5-link suspension system. For instance, the exemplary embodiments described herein utilize a 5-link suspension architecture to employ five relatively light and inexpensive two-force members, while also improving vehicle driving comfort and noise by decoupling caster stiffness from wheel recession rate. Various exemplary embodiments described, herein, for example, contemplate a 5-link independent suspension system comprising an integral link that decouples caster compliance from longitudinal compliance (recession compliance), thereby delivering the cornering, handling, and steering performance of a conventional 5-link suspension architecture, but with the longitudinal isolation associated with the more comfortable suspension design of the conventional integral link suspension architecture.

Figure 5:
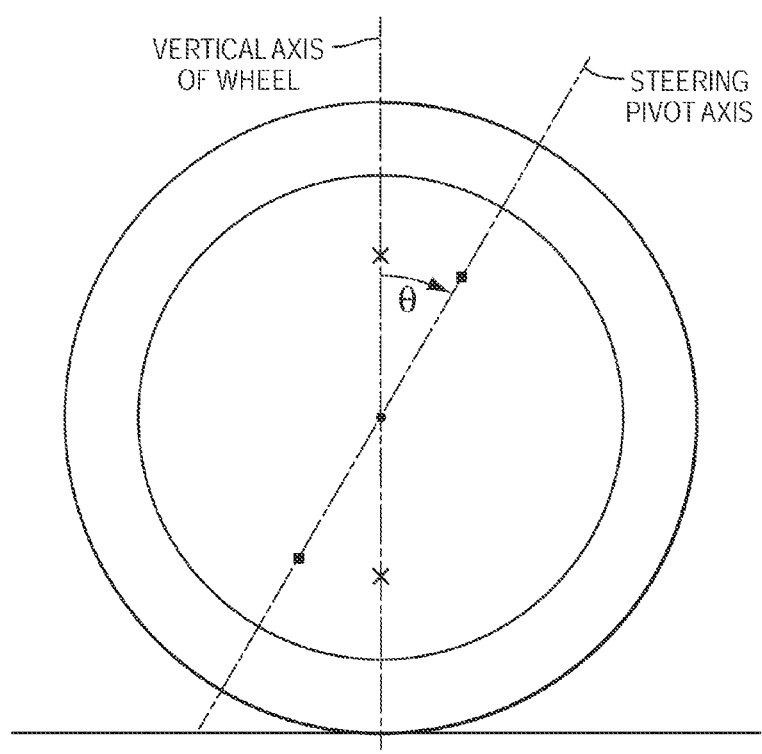
FIG. 5 is a schematic view of a vehicle wheel illustrating a caster angle.

As would be understood by those of ordinary skill in the art, with reference to a wheel of a motor vehicle, caster is the angle θ (see FIG. 5) to which the steering pivot axis is tilted forward or rearward from vertical, as viewed from the side of the wheel. Caster stiffness, therefore, refers to the side view wind-up stiffness, or torsional stiffness (the ratio of applied torsion moment to angle of twist), of the wheel due to a fore/aft load (i.e., acceleration/braking force) applied at a contact patch of the tire with the road. Furthermore, caster compliance is the opposite of caster stiffness and relates to the rotational displacement of the steering axis when an acceleration/braking force is applied at the contact patch (displacement/force).

Wheel recession rate refers to the wheel center stiffness (force/displacement) due to a fore/aft load (i.e. acceleration/braking force) applied at the wheel center. Recession compliance, or longitudinal compliance, is therefore the opposite of wheel recession rate and relates to the rearward displacement of the wheel when a force is applied in that direction (displacement/force).

Accordingly, as would be further understood by those of ordinary skill in the art, when coupled, there is an inherent trade-off between the recession compliance and the caster compliance of a vehicle's suspension system. Some longitudinal compliance is generally desired (i.e., a softer wheel recession rate) in order to give the suspension the ability to absorb longitudinal force inputs associated, for example, with a rough road surface (e.g., potholes). The associated caster compliance (i.e., a soft caster stiffness), however, is generally not desirable since it may reduce the stability of the vehicle's steering as the steering axis rotates and the caster angle and caster trail (i.e., the side view horizontal distance from the ground intercept of the steering axis to the contact patch center) are reduced.

Figure 1:
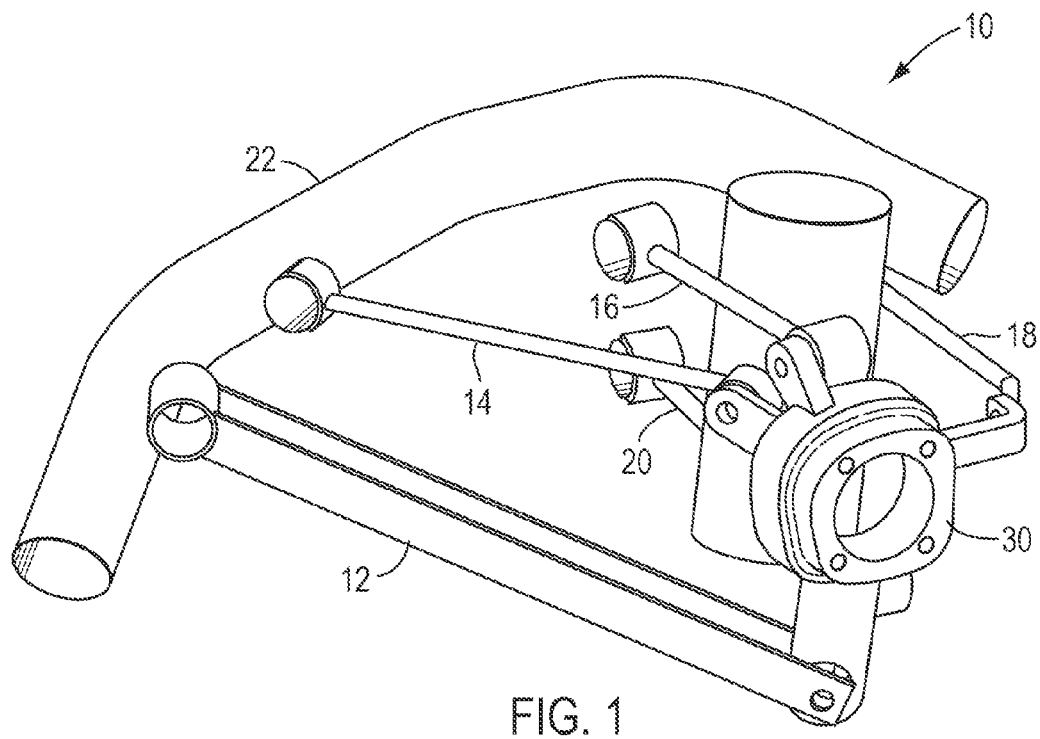
FIG. 1 is a perspective view of a conventional 5-link rear independent suspension system.

FIG. 1 illustrates an exemplary arrangement of the components of a conventional 5-link IRS system 10. The IRS system 10 includes a lower trailing link 12, an upper trailing link 14, a camber link 16, a toe link 18, and a spring link 20, which are all connected to a steering knuckle 30. As would be understood by those of ordinary skill in the art, the lower and upper trailing links 12 and 14 constitute the longitudinal linkages, which serve to locate the wheel longitudinally and to react to tractive loads and brake torques when the IRS system is in use. As illustrated in FIG. 1, when in use, the lower and upper trailing links 12 and 14 are within the envelope of a frame rail 22 of a motor vehicle (not shown), and extend between the steering knuckle 30 and the frame rail 22 (to which the trailing links 12 and 14 are also attached). As would be further understood by those of ordinary skill in the art, the camber link 16, the toe link 18, and the spring link 20 constitute the portion of the IRS system 10 that establishes the wheel plane orientation and reacts to vertical and lateral loads.

Figure 2:
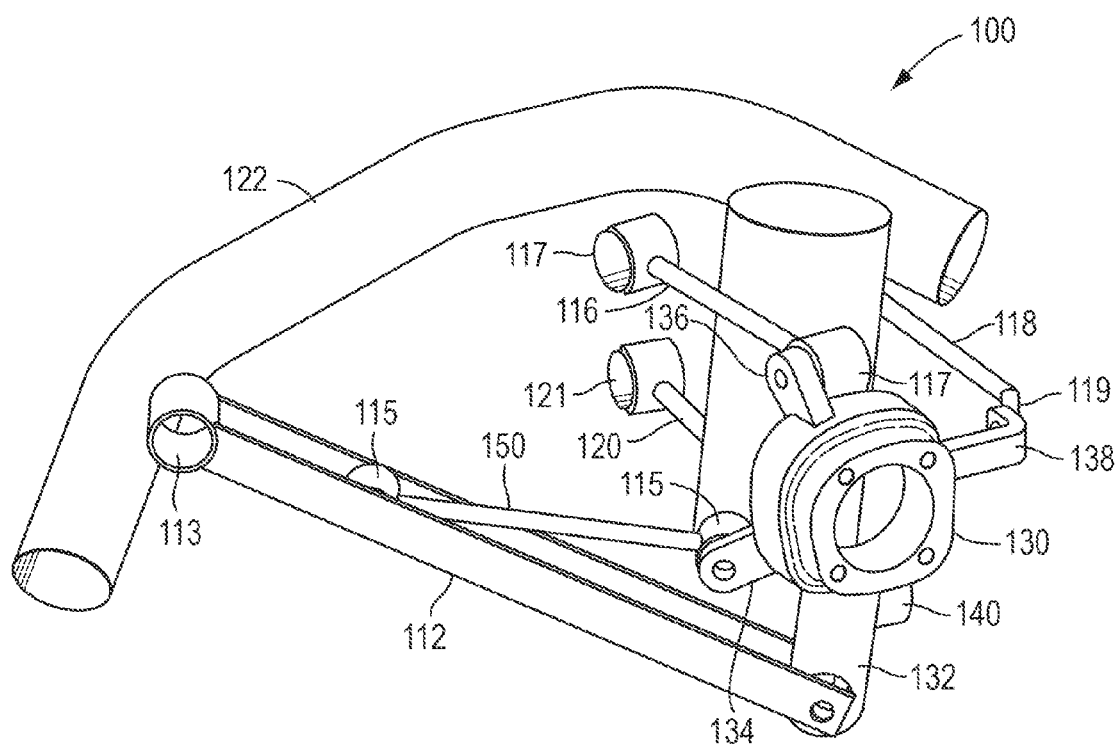
FIG. 2 is a perspective view of an exemplary embodiment of an integral 5-link rear independent suspension system in accordance with the present disclosure.

FIG. 2 illustrates an exemplary embodiment of an integral 5-link IRS system 100 in accordance with the present disclosure. Similar to the conventional 5-link IRS system 10 illustrated in FIG. 1, the IRS system 100 includes a trailing link 112 (similar to the lower trailing link 12), a camber link 116, a toe link 118, and a spring link 120, which are all connected to a steering knuckle 130 via, for example, respective flanges 132, 136, 138, and 140. Unlike the conventional IRS system 10, however, IRS systems in accordance with the present disclosure do not have an upper trailing link (e.g., upper trailing link 14), but instead contemplate using an integral link that is positioned between the lower trailing link and the steering knuckle. As illustrated in FIG. 2, for example, in various embodiments, the IRS system 100 includes an integral link 150 that is connected to the steering knuckle above the trailing link 112, via, for example, a flange 134.

In various embodiments of the present disclosure, for example, each of the trailing link 112, integral link 150, camber link 116, toe link 118, and spring link 120 comprises a two-force, tension/compression link having respective rubber bushings 113, 115, 117, 119, and 121 at each of its respective ends (which connects, for example, at one end with the respective flange 132, 134, 136, 138, and 140 of the steering knuckle 130). Those of ordinary skill in the art would understand, however, that the IRS system 100 of FIG. 2 is exemplary only in that the links 112, 150, 116, 118, and 120, and the steering knuckle 130 to which the links are connected, may have various alternative configurations (i.e., shapes and/or cross-sections), lengths, dimensions, and/or connection points without departing from the scope of the present disclosure and claims. In various additional embodiments, the spring link 120 may, for example, also support a vertical load. In various further embodiments, the integral link 150 may be connected to the steering knuckle 130 below the trailing link 112. Furthermore, the links 112, 150, 116, 118, and 120 and the steering knuckle 130 may be configured to connect via any method and/or technique known to those of ordinary skill in the art, and are not limited to the flanges and bushings shown in FIG. 2. In various embodiments, for example, although not shown, the links 112, 150, 116, 118, and 120 may be connected to the steering knuckle 130 via a spherical joint.

In accordance with various exemplary embodiments of the present disclosure, when the IRS system 100 is in use, the steering knuckle 130 is configured to be disposed within an internal space of a rear wheel (not shown) of a motor vehicle (not shown). Accordingly, as illustrated in FIG. 2, when the IRS system 100 is in use, the camber link 116, the toe link 118, and the spring link 120 are configured to be substantially laterally disposed with respect to a longitudinal axis (not shown) of the motor vehicle, and the trailing link 112 and the integral link 150 are configured to be substantially longitudinally disposed with respect to the longitudinal axis of the motor vehicle.

Thus, as illustrated in FIG. 2, when the IRS system 100 is in use, the trailing link 112 is connected to a lower end of the steering knuckle 130 via the flange 132, and extends along a single axis between the steering knuckle 130 and a frame rail 122 of the motor vehicle, and the integral link 150 is positioned such that it extends between the steering knuckle 130 and the trailing link 112. The steering knuckle 130 is, therefore, directly connected to the frame rail 122 via the trailing arm 112 and indirectly via the integral link 150. In this manner, the integral link 150 may decouple caster stiffness, or the windup stiffness associated with the steering knuckle 130, from the wheel recession rate. In various embodiments, for example, since the integral link 150 is not connected to the frame rail 122, the bushing 115 that connects the integral link 150 to the flange 134 of the steering knuckle 130 can be stiff to counteract the rotation of the steering knuckle 130, without effecting the ability of the suspension system 100 to absorb longitudinal forces.

As used herein, the term "frame rail" refers to any type of vehicle frame rail, including but not limited to, rails that form the main structure of the chassis of the motor vehicle and subframe rails that form frame sections that attach to the chassis.

To verify the expected compliances of the suspension systems in accordance with the present disclosure, an integral 5-link suspension system in accordance with the present disclosure, similar to the IRS suspension system 100 illustrated and described above with reference to FIG. 2, was modeled in Adams, a Multibody Dynamics (MBD) simulation software by MSC Software®. A conventional 5-link suspension system and a conventional integral link suspension system were also modeled in Adams for comparison purposes.

Figure 3:
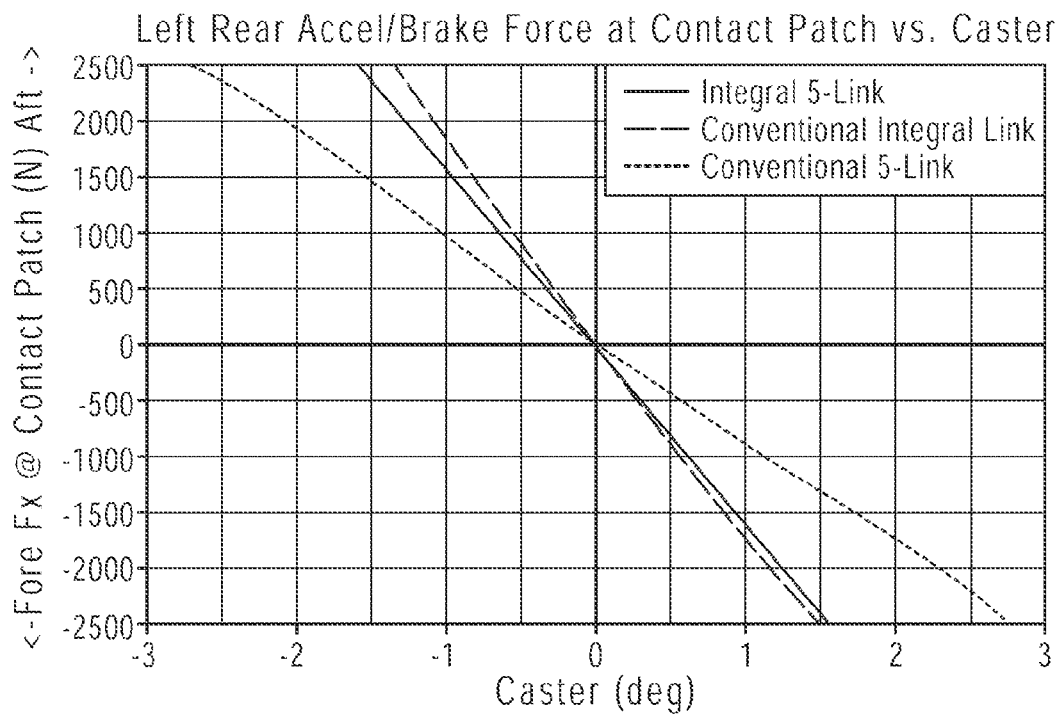
FIG. 3 is a graph comparing caster compliance of a modeled integral 5-link rear independent suspension system in accordance with the present disclosure with modeled conventional 5-link and integral link rear independent suspension systems.

FIG. 3 is a graph comparing the caster compliance of the modeled integral 5-link rear independent suspension system with the modeled conventional 5-link and integral link rear independent suspension systems. As illustrated in FIG. 3, the caster compliance of the integral 5-link suspension system was stiffer (which provides better stability of the vehicle's steering) than the conventional 5-link suspension system and similar to the conventional integral link suspension system.

Figure 4:
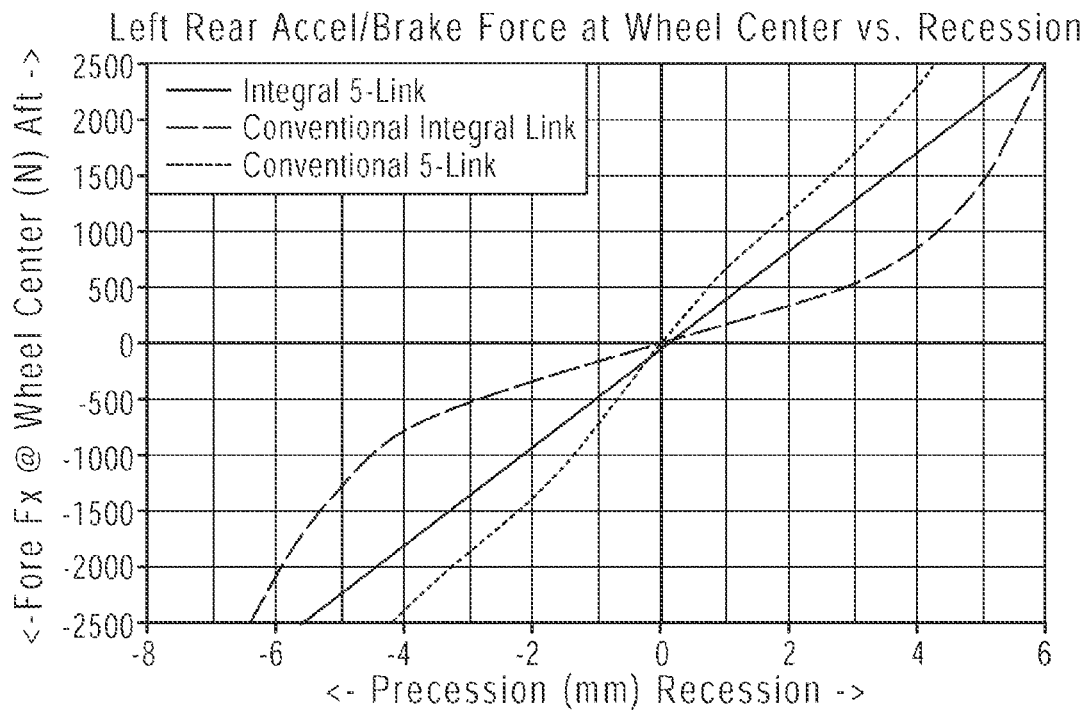
FIG. 4 is a graph comparing recession compliance of the modeled integral 5-link rear independent suspension system with the modeled conventional 5-link and integral link rear independent suspension systems.

FIG. 4 is a graph comparing the recession compliance of the modeled integral 5-link rear independent suspension system with the modeled conventional 5-link and integral link rear independent suspension systems. As illustrated in FIG. 4, the recession compliance of the integral 5-link suspension system was softer (which allows the suspension system to absorb longitudinal forces better) than the conventional 5-link suspension system and stiffer than the conventional integral link suspension system.

It was, therefore, determined that the disclosed integral 5-link suspension system can provide a relatively stiff caster stiffness, similar to that of the conventional integral link suspension system (e.g., within about 10%), and a relatively soft wheel recession rate, somewhere in between the conventional integral 5-link and integral link suspension systems (e.g., within the tuning range for competitive integral link systems). Integral 5-link suspension systems in accordance with the present disclosure may, for example, be about 50% to about 80% stiffer for caster stiffness, while being about 30% to about 50% softer in wheel recession rate, than a conventional 5-link suspension system.

Accordingly, integral 5-link suspension systems in accordance with the present disclosure may effectively decouple the caster and recession compliances, thereby providing the cornering, handling, and steering performance of the relatively light and inexpensive traditional 5-link suspension system, but with the longitudinal isolation associated with the more expensive and heavy integral link suspension system. Integral 5-link suspension systems in accordance with the present disclosure may, for example, weigh about 10% to about 30% less, and cost about 10% to about 20% less to manufacture, than a conventional integral link suspension system.

Furthermore, similar to the conventional integral link suspension system, integral 5-link suspension systems in accordance with the present disclosure do not have an upper trailing link, thereby allowing the vehicle's load floor to be reduced in height compared with a traditional 5-link suspension system (which utilizes an upper trailing arm). Integral 5-link suspension systems in accordance with the present disclosure may, for example, allow the load floor to be about 50 mm to about 75 mm lower than a traditional 5-link suspension system, providing for more flexibility in the suspension's design and efficiency in the suspension's packaging.

Accordingly, integral 5-link suspension systems in accordance with the present disclosure may function like a conventional integral link suspension system (and provide the advantages of the integral link system vs. the conventional 5-link system), while having a cost and weight similar to that of the conventional 5-link suspension system.

While the present disclosure has been disclosed in terms of exemplary embodiments in order to facilitate better understanding of the disclosure, it should be appreciated that the disclosure can be embodied in various ways without departing from the principle of the disclosure. Therefore, the disclosure should be understood to include all possible embodiments which can be embodied without departing from the principle of the disclosure set out in the appended claims. Furthermore, although the present disclosure has been discussed with relation to automotive vehicles, those of ordinary skill in the art would understand that the present teachings as disclosed would work equally well for any type of vehicle having one or more wheels connected to the vehicle via a suspension system.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A 5-link independent suspension system for vehicles, comprising:
    a steering knuckle;
    camber, toe, spring, and integral links; and
    a trailing link extending along a single axis, each of the links comprising a first end connected to a different location of the steering knuckle, second ends of the camber, toe, spring, and trailing links being configured for attachment to a frame rail and a second end of the integral link being attached to the trailing link.

2. The suspension system of claim 1, wherein the steering knuckle is configured to be disposed within an internal space of a rear wheel of the vehicles.

3. The suspension system of claim 1, wherein each of the camber, toe, spring, trailing, and integral links has a rubber bushing at each end of the link.

4. The suspension system of claim 1, wherein each of the camber, toe, spring, trailing, and integral links comprises a tension/compression link.

5. The suspension system of claim 4, wherein the spring link supports a vertical load.

6. The suspension system of claim 1, wherein the camber link, the toe link, and the spring link are configured to be substantially laterally disposed with respect to a longitudinal axis of the vehicles when the suspension system is in use.

7. The suspension system of claim 1, wherein the trailing link and the integral link are configured to be substantially longitudinally disposed with respect to a longitudinal axis of the vehicles when the suspension system is in use.

8. The suspension system of claim 1, wherein the integral link is configured to decouple caster stiffness from wheel recession rate when the suspension system is in use.

9. The suspension system of claim 1, wherein the integral link is configured to counteract a rotation of the steering knuckle when the suspension system is in use.

10. The suspension system of claim 1, wherein the trailing link is connected to a lower end of the steering knuckle and the integral link is connected to the steering knuckle above the trailing link.

11. The suspension system of claim 1, wherein the first end of the integral link is connected to the steering knuckle via a flange on the steering knuckle.

12. A 5-link independent suspension system for a motor vehicle, comprising:
    a steering knuckle disposed within an internal space of a rear wheel of the vehicle, the steering knuckle comprising an upper end oriented towards a body of the vehicle and a lower end oriented towards a road surface;
    a camber link comprising a first end connected to the steering knuckle and a second end connected to a frame rail of the vehicle;
    a toe link comprising a first end connected to the steering knuckle and a second end connected to the frame rail;
    a spring link comprising a first end connected to the steering knuckle and a second end connected to the frame rail;
    a trailing link comprising a first end connected to the lower end of the steering knuckle and a second end connected to the frame rail, wherein the trailing link extends along a single axis between the steering knuckle and the frame rail; and
    an integral link comprising a first end connected to the steering knuckle above the trailing link and a second end connected to the trailing link, wherein the first end of the integral link is connected to the steering knuckle at a location that is closer to the lower end of the steering knuckle than the upper end of the steering knuckle,
    wherein the first end of each of the camber, toe, spring, trailing, and integral links is connected to the steering knuckle at a different location of the steering knuckle.

13. The suspension system of claim 12, wherein each of the camber, toe, spring, trailing, and integral links has a rubber bushing at each end of the link.

14. The suspension system of claim 12, wherein each of the camber, toe, spring, trailing, and integral links comprises a tension/compression link.

15. The suspension system of claim 14, wherein the spring link supports a vertical load.

16. The suspension system of claim 12, wherein the camber link, the toe link, and the spring link are substantially laterally disposed with respect to a longitudinal axis of the motor vehicle.

17. The suspension system of claim 12, wherein the trailing link and the integral link are substantially longitudinally disposed with respect to a longitudinal axis of the motor vehicle.

18. The suspension system of claim 12, wherein the integral link is configured to decouple caster stiffness from wheel recession rate.

19. The suspension system of claim 12, wherein the integral link is configured to counteract a rotation of the steering knuckle.

20. The suspension system of claim 12, wherein the first end of the integral link is connected to the steering knuckle via a flange on the steering knuckle.

21. The suspension system of claim 12, wherein the steering knuckle further comprises a first side and a second side opposite the first side, wherein the first end of the camber link is connected to the upper end of the steering knuckle, wherein the first end of the toe link is connected to the first side of the steering knuckle, wherein the first end of the spring link is connected to the lower end of the steering knuckle, and wherein the first end of the integral link is connected to the second side of the steering knuckle.

* * * * *